Nov. 28, 1967    G. W. BAUGHMAN    3,355,584

TRAIN SPEED CONTROL SYSTEM

Filed Oct. 1, 1965    6 Sheets-Sheet 1

INVENTOR.
George W. Baughman.
BY W. L. Stout.
HIS ATTORNEY

Nov. 28, 1967  G. W. BAUGHMAN  3,355,584
TRAIN SPEED CONTROL SYSTEM
Filed Oct. 1, 1965  6 Sheets-Sheet 2

INVENTOR.
George W. Baughman.
BY W. L. Stout.
HIS ATTORNEY

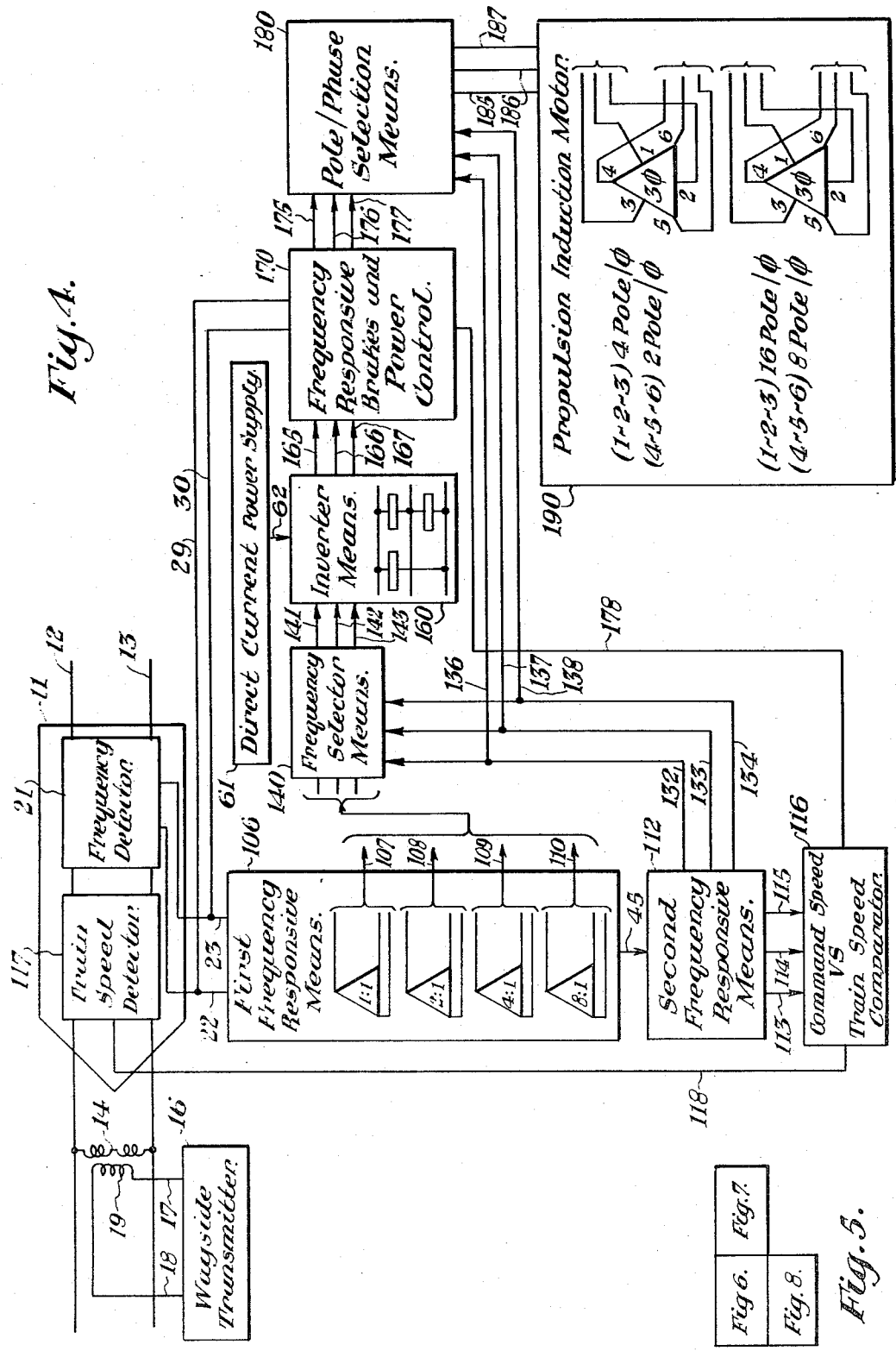

Nov. 28, 1967  G. W. BAUGHMAN  3,355,584
TRAIN SPEED CONTROL SYSTEM
Filed Oct. 1, 1965  6 Sheets-Sheet INVENTOR.
George W. Baughman.
BY W. L. Stout.
HIS ATTORNEY Nov. 28, 1967  G. W. BAUGHMAN  3,355,584
TRAIN SPEED CONTROL SYSTEM
Filed Oct. 1, 1965  6 Sheets-Sheet 5
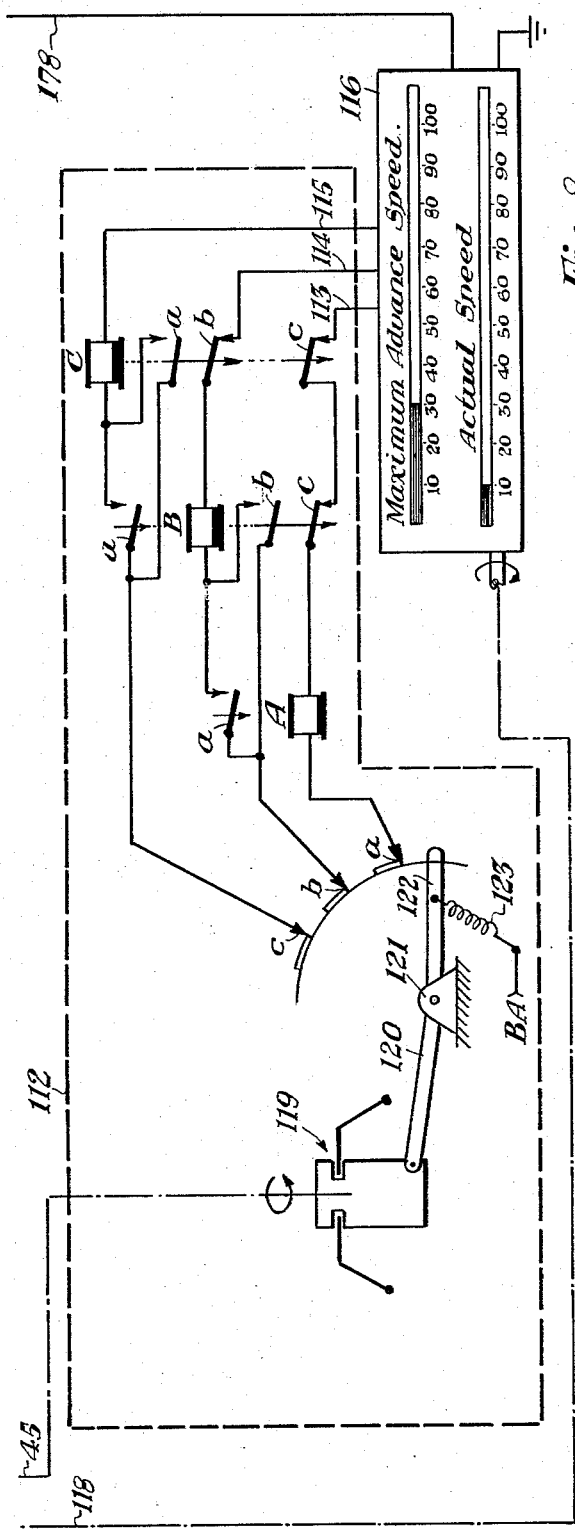
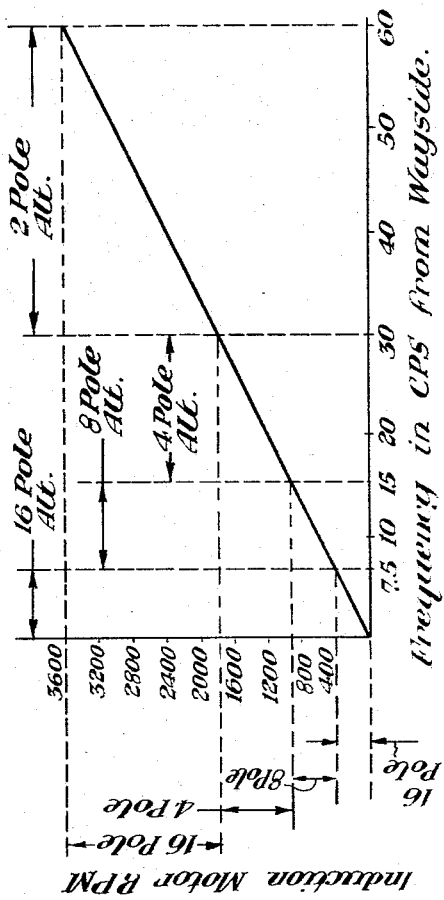
INVENTOR.
George W. Baughman
BY W. L. Stout
HIS ATTORNEY

3,355,584
TRAIN SPEED CONTROL SYSTEM
George W. Baughman, Swissvale, Pa., assignor to Westinghouse Air Brake Company, Swissvale, Pa., a corporation of Pennsylvania
Filed Oct. 1, 1965, Ser. No. 492,134
31 Claims. (Cl. 246—187)

This invention relates to a train speed control system. More specifically this invention relates to a train speed control system in which the propulsion motor or motors may have selectable multipole per phase connections and the motor or motors are polyphase induction motors having an alternating current power supply obtained from a direct current power supply through inverters. The selection of a pole per phase connection is dependent upon a selectable pole per phase alternator output which is controlled either by the speed of the train or the presence of a distinctive signal received from the wayside. The output speed of the polyphase induction motor or motors is directly proportional to the frequency of the switching of the inverters which connect the direct current power supply to the motors. The frequency is a function of selected pole per phase alternator output. The alternator r.p.m. is controlled by a distinctive speed command control signal delivered to the train from the wayside.

Increasing traffic density patterns in all major population centers of the world have brought about a critical need to economically transport people from the burgeoning suburbs into the hubs of the population centers. Highly efficient rapid and economical transit systems with vehicles traveling at very close headways are becoming the only effective method of coping with the increasing congestion found in modern cities. The application of prior art systems to meet these circumstances has been thwarted by their inherent inability to provide comfortable, smoothly variable, high speed, close headway and fail-safe system operation.

The system to be described hereinafter meets all of these just noted requisites by the incorporation of a unique and economical train speed control system that may be incorporated with minor modification into now existing train propulsion systems.

In the system to be described the output from the propulsion motors is directly and completely dependent upon a distinctive speed command signal from the wayside. The speed command signal is a positive measure of the maximum permissible speed for any given headway between trains or in the event of a broken rail or other malfunction of the system the propulsion motor speed would instantly be corrected to reflect the needed change in train speed operation.

It is therefore an object of this invention to provide automatic speed control by the utilization of a wayside controlled selectable multipole per phase alternator output which controls the commutation of a direct current power supply to a selectable pole per phase propulsion induction motor.

Another object of this invention is to provide the most efficient train speed and propulsion motor control by the selection of a pole per phase alternator output with a matching pole per phase connection of the propulsion induction motor, which selection is controlled by the speed of the train.

Another object of this invention is to provide the most efficient train speed and propulsion motor control by the selection of a pole per phase alternator output with a matching pole per phase connection of the propulsion induction motor, which selection is controlled by predetermined train speed control frequency ranges delivered from the wayside and detected by apparatus on the train.

Yet another object of this invention is to provide a fail-safe train speed control system that inherently operates in a speed restrictive manner in the event of a failure in any portion of the control system.

Another object of this invention is the provision of an automatic train speed control system that completely obviates the need for complex programming to attain variable train speed control and attains this end by the incorporation of solid state electronics to connect a direct current power supply to selectable multipole, multiphase propulsion induction motors.

Another object of this invention is the provision of an automatic train speed control system that may be utilized in trains operating in electrified territory as well as self propelled trains such as diesel electric driven trains in non-electrified territory.

In the attainment of the foregoing objects there is utilized a train speed control system which includes the running rails upon which the train travels and a direct current power supply for the train's propulsion induction motor or motors. A source of variable frequency energy forms an integral part of the system. This source of variable frequency energy provides a train speed control function.

It should be understood that while the invention to be described is directed to the utilization of a frequency variable train speed control signal, the use of any distinctive command signal from the wayside may be effectively employed.

In each of the embodiments to be described the source of variable frequency energy includes a wayside transmitter and a transmission link to the train which may include the running rails. The frequency transmitted to the train at any instant is determined by the safety of traffic conditions in advance.

The remaining apparatus of the system is carried by the train and includes a frequency detector or command signal detector electrically coupled to the rails to detect the motor speed control signal which may be of a variable frequency delivered from the wayside via the aforementioned transmission link. A frequency responsive unit or command signal responsive unit which may include an induction motor has the induction motor's speed controlled by the variable frequency speed control signal or command signal delivered from the wayside. The speed of the induction motor included in the frequency responsive unit is a direct function of the frequency or command signal received by the frequency detector or command signal detector from the wayside.

In one embodiment of the invention there is a frequency selector means electrically connected to the frequency responsive unit. In addition, there is provided a train speed responsive unit which controls both the frequency selector means and a pole per phase selector unit. An integral portion of the control system includes a solid state inverter to connect the direct current power supply to a select pole per phase connection of a multiphase, multipole per phase propulsion induction motor. The selection of the appropriate alternator frequency and the corresponding pole per phase connection of the propulsion motor is accomplished by the train speed responsive unit aforementioned. In conclusion it is therefore evident that this embodiment of the invention provides a propulsion speed control system, which speed control is mutually dependent upon the variable frequency signal delivered from the wayside and the pole per phase selection controlled by the train speed responsive unit.

In the second embodiment of the invention to be described there is included an additional frequency responsive unit which is controlled by the frequency responsive means. This additional frequency responsive unit takes the place of the train speed responsive unit and establishes a series of frequency control ranges which determine the pole per phase connections of the propulsion induction motor or motors. The train speed control of this second embodiment is therefore mutually dependent upon the variable frequency signal delivered from the wayside and the pole per phase selection controlled by the means which provides a second frequency responsive, frequency range selecting function.

Other objects and advantages of the present invention will become apparent from the ensuing description of illustrative embodiments thereof, in the course of which reference is had to the accompanying drawings in which:

FIG. 4 is a block diagram of a second embodiment of the invention.

FIG. 5 is a diagram depicting the manner in which FIGS. 6, 7 and 8 are interconnected to illustrate a complete circuit diagram of the embodiment of the invention shown in FIG. 4.

FIG. 9 is a graph of propulsion r.p.m. versus train speed frequency in cycles per second from the wayside.

A description of the above embodiments will follow and then the novel features of the invention will be presented in the appended claims.

Figure 1:
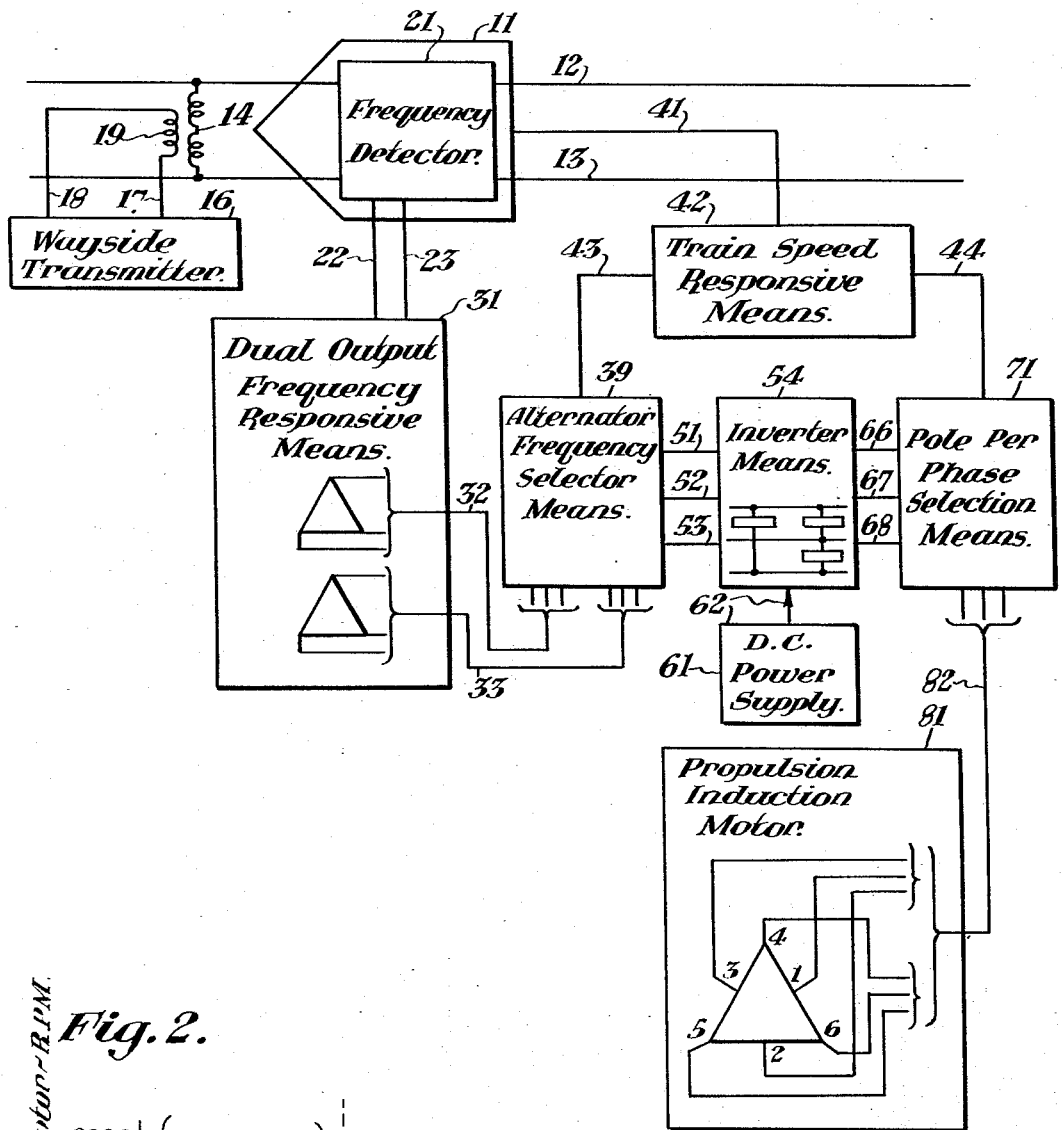
FIG. 1 illustrates in block diagram form one embodiment of the train speed control system of the invention.

Reference is now made to FIG. 1 which illustrates in block diagram form one embodiment of the invention. In this figure is illustrated a train 11 depicted as traveling to the left along the rails 12 and 13. To the left-hand side of this figure there is illustrated an impedance bond 14, the main winding of which connects the rails 12 and 13. The impedance bond is of the type described in the copending application for Letters Patent of the United States, Ser. No. 382,551, filed July 14, 1964, and now Patent No. 3,268,843, for Electric Induction Apparatus, by Ralph Popp. The impedance bond 14 serves the function of balancing the propulsion return current between the rails when the train is operating in electrified territory, and also as a part of a signal system not shown. In order that a signal be impressed in the rails 12 and 13 there is located at the wayside a wayside transmitter 16 which is connected via the electrical leads 17 and 18 to a primary winding 19 of the impedance bond 14. The wayside transmitter 16 is of the same type and functions in a manner similar to the wayside transmitter described in significant detail in the copending application for Letters Patent of the United States of Crawford E. Staples, Ser. No. 382,620, filed July 14, 1964, and now Patent No. 3,328,580, for a Rapid Transit Speed Control System.

This wayside transmitter 16 delivers to the rails 12 and 13 a series of variable frequency signals or some other distinctive signals, which signals are placed in the rails 12 and 13 via the impedance bond 14, as previously noted. These variable frequency signals or distinctive signals, which are a measure of the control speed at which the train is authorized to travel, are conducted along the rails 12 and 13 where they are detected by frequency detector 21 which is carried by the train. A completed circuit is formed by the impedance bond 14, the rails 12 and 13, and the axle and wheels of the train, which axle and wheels are not shown. The frequency detector 21 will be described in more detail hereafter. This frequency detector 21 may also be referred to as a command signal detector means. The output from the frequency detector 21 is delivered via the electrical leads 22 and 23 to a dual output frequency responsive means 31. The frequency responsive means 31 may also be referred to as a command signal responsive means. The dual output frequency responsive means 31 has a pair of alternators schematically illustrated in the lower portion of the black 31. There are two outputs 32 and 33 from this dual output frequency responsive means 31. These outputs 32 and 33 are fed to an alternator frequency selector means 39, which frequency selector means functions to select one or the other of the two outputs from the dual output frequency responsive means 31. This selection of one of the two outputs 32 or 33 from the dual output frequency responsive means is controlled by a train speed responsive means 42 which is controlled by an output 41 from the train 11. This train speed responsive means has a pair of outputs 43 and 44. The output 43 functions to control the alternator frequency selector means in response to a predetermined train speed which has been detected by the train speed responsive means 42. Upon the determination of a preselected speed, a control output via the electrical connection 43 to the alternator frequency selector means 39 produces a selection of one of the two outputs 32 or 33 to be deliverd to an inverter means 54 via the electrical connections 51, 52 and 53.

The inverter means 54 is of the same type described in expansive detail in my copending application for Letters Patent of the United States, Ser. No. 492,008, filed Oct. 1, 1965, for Train Speed Control System. The inverter unit 54 serves the important function of connecting in a proper timed sequence the direct current power supply 61 via its direct current power lead 62 through the inverter 54 and the pole per phase selection means 41, to the induction motor 81. The rate at which the direct current power is fed to the inverter means 54 is controlled by one of the outputs 32 or 33 from the dual output frequency responsive means 31 which has been selected by the alternator frequency selector means 39, which frequency selector means 39 has in turn been controlled by the train speed responsive means 42 in a manner described earlier. In other words, the frequency selector means 39 will permit the commutation of the direct current power supply 61 via the inverter means 54, the electrical leads 66, 67 and 68 and pole per phase selection means 71 to the propulsion induction motor 81 via the electrical lead schematically shown at 82 in FIG. 1.

This delivery of direct current power commutated by the inverter means and delivered to the propulsion induction motor 81 has impressed upon it another control aspect, namely, the selection of a pole per phase dependent upon the speed desired to be delivered by the propulsion induction motor 81. At this time it should be noted that the propulsion induction motor 81 has more than one winding. In this example there are illustrated schematically in the block 81 a two-winding propulsion induction motor of the same type set forth in the Standard Handbook for Electrical Engineers on page 706, 7th Edition of this handbook. This arrangement generally depicted in block 81 permits the selection of one or the other of two different pole per phase connections. The selection of a pole per phase connection determines the ultimate speed of the propulsion induction motor. This ultimate speed is also dependent upon the frequency of the signal received by the propulsion induction motor. The ultimate r.p.m. of the propulsion induction motor is determined by the following well-known equation:

$$\text{r.p.m. of propulsion induction motor} = \frac{120 \times f}{P}$$

where $f=$ the frequency in cycles per second of motor's power supply and $P=$ the number of poles per phase utilized in the propulsion motor.

It will therefore be seen that the pole per phase selection means 71 controls the number of poles per phase selected to be used in the propulsion induction motor 81, and the pole per phase selection means is in turn controlled by the train speed responsive means 42 via the output 44 from the train speed responsive means 42.

Figure 2:
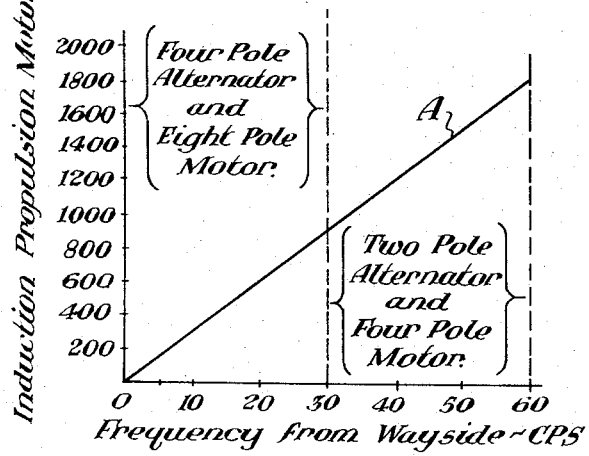
FIG. 2 is a graph of propulsion r.p.m. versus train speed frequency in cycles per second from the wayside.

Generally speaking, the operation of the embodiment of this invention illustrated in FIG. 1 can best be understood by a study of the graph set forth in FIG. 2. Reference is now made to FIG. 2 which illustrates in graphic form the operational characteristics of the system illustrated in FIG. 1. The graph plots frequency delivered from the wayside in cycles per second against induction propulsion motor r.p.m. This graph and the line A on the graph show the motor speed which has been determined as a result of the application of the above formula for r.p.m. This graph takes into account both a change in frequency and also includes the change in number of poles per phase in the induction propulsion motor. The graph also includes the change in frequency brought about by the use of two different alternators. In the first instance during the first range of speed when the frequency from the wayside is between zero and 30 cycles per second, the dual output frequency responsive means 31 is driving one of the two alternators. In the first instance it is a four-pole alternator which in effect doubles the frequency delivered by the frequency responsive means from that being received from the wayside. The speed responsive means 42 is now in its first range of operation and until the speed of the train reaches a predetermined point, which corresponds to a frequency of 30 cycles per second from the wayside, the propulsion motor r.p.m. will continue to increase to a speed of 900 revolutions per minute for the propulsion induction motor. It should also be noted that during the initial range the propulsion induction motor 81 has utilized only one of the pole per phase connections of the motor 81. In this instance the 8-pole per phase winding of the motor and the 8-pole per phase alternator connection is combined. The resultant speed range is depicted by the graph and the line A.

When the train speed determined by the train speed responsive means 42 reaches a predetermined speed, the alternator frequency selector means 39 and the pole per phase selection means 71 are simultaneously controlled to shift, on the one hand, the output from the dual output frequency responsive means 31 to a 2-pole alternator output and at the same time there is a shift in the pole per phase selection means of the propulsion induction motor to a 4-pole per phase induction motor arrangement which produces the second range of speed for the system. Therefore, the frequency from the wayside, as set forth in this FIG. 2, in the range from 30 cycles per second to 60 cycles per second, produces a second range of speed. It will be noted that the output speed of the induction propulsion motor 81 is therefore mutually dependent upon the frequency delivered by the wayside transmitter 16 to the tracks 12 and 13 and also upon the pole per phase selection made by the pole per phase selection means 71 for the propulsion induction motor 81. This particular arrangement provides a change in the propulsion control which is dependent upon the speed of the train.

The next embodiment to be described permits the change in train speed control to function over a series of ranges which are purely frequency determined ranges which, of course, bear a direct relationship to the ultimate speed the train is to travel. This latter embodiment will be described in detail with reference to FIGS. 4 through 8.

Figure 3:
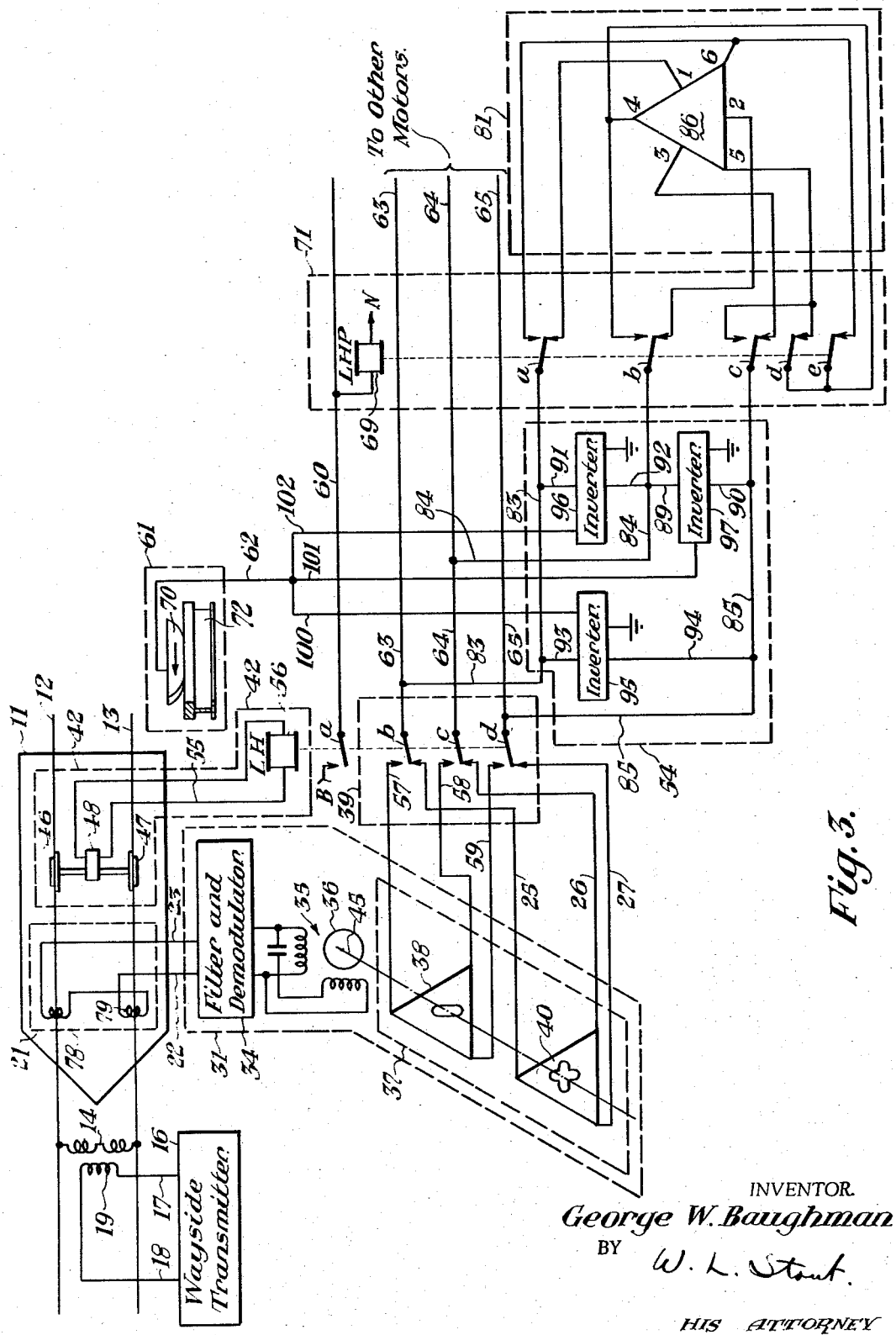
FIG. 3 is a circuit diagram of the system set forth in FIG. 1.

Reference is now made to FIG. 3 in which there is illustrated in a more detailed form the invention as set forth in FIG. 1. It will be noted that wherever applicable, the block depicted in FIG. 1 will be shown in dotted outlined fashion in FIG. 3. This is intended to facilitate an understanding of precisely what components are present in each of the blocks set forth in FIG. 1. Accordingly, it will be seen that the train 11, which travels along the rails 12 and 13, has mounted integrally on the train a frequency detector 21, which frequency detector 21 is comprised of a pair of coils 78 and 79. These detector coils 78 and 79 have electrical leads 22 and 23 connected to the respective coils 79 and 78. These detector coils are mounted on the train and positioned over the rails 12 and 13 to inductively pick up the signals placed in the rails from the wayside transmitter 16, as described with reference to FIG. 1. These coils 78 and 79 are mounted in a series aiding relationship and their output is sent over the leads 22 and 23 to the dual output frequency responsive means 31. The dual output frequency responsive means 31 has a split phase induction motor 35 which is driven at a speed proportional to the frequency received from the wayside transmitter 16. The signals that appear in the rails 12 and 13, which have been delivered from the wayside via the primary coil 19 of the impedance bond 14, are carried along the electrical leads 22 and 23 from the frequency detector 21 and into a filter and demodulator 34 where this signal energy is then delivered to the split phase induction motor 35 which has a rotor 36 which is driven at a speed directly proportional to the frequency received by the split phase induction motor 35. The rotor 36 of the split phase induction motor 35 has a mechanical output 45 shown in this figure in a dashed and dotted manner. This mechanical link 45 in turn drives two alternators 38 and 40, respectively, the first alternator 38 having a 2-pole permanent magnet rotor and the second alternator 40 having a 4-pole permanent magnet rotor. With this arrangement, the first alternator 38 will have an output which is directly proportional to the frequency received by the frequency responsive split phase induction motor 35, and the 2-pole alternator 38 will deliver an output which represents a one-to-one ratio, that is, the input to output, the rotational input to the alternator being a measure of the frequency received from the wayside. The second alternator 40 is a 4-pole alternator and accordingly this alternator will have an output frequency that is two-to-one with reference to the output frequency of alternator 38.

There is also mounted on the train 11 a speed responsive means 42. This speed responsive means 42, for purposes of illustration, is schematically shown in this drawing as including a pair of train wheels 46 and 47 interconnected by an axle 49. Mounted on the axle 49 is a speed detector 48 of a conventional mechanical nature which transfers rotational mechanical speed of the axle 49 into an electrical signal which in turn is delivered to the relay LH which serves to control the frequency selector means 39. This relay LH is only actuated when the train reaches a predetermined speed, for example, 30 miles an hour, which might be midway in the range of speeds which the train is intended to be driven at. Accordingly, the maximum speed in this exemplary situation would be 60 miles an hour.

By way of brief review, it is seen therefore that the alternators 38 and 40 provide what has been designated as an alternator means 37. The outputs of the alternators 38 and 40 are delivered to the frequency selector means 39. The function of the frequency selector means 39 will be explained in more detail hereafter.

There is also provided in this embodiment an inverter means 54 which contains at least three individual inverters 95, 96 and 97 which are needed for each phase of power to be delivered to the propulsion induction motor 81. The inverter 95 is electrically connected between the electrical leads 83 and 85 via the electrical leads 93 and 94, while the inverter 96 is connected between the electrical leads 83 and 84 via the electrical leads 91 and 92. The last inverter 97 is connected between the electrical leads 84 and 85 via the electrical leads 89 and 90. It will be seen as the description ensues that there is an inverter for each phase of the propulsion induction motor 81.

The inverters 95, 96 and 97 are connected respectively to the electrical leads 100, 101 and 102 which, in turn, are connected to the direct current power supply 61 by the electrical lead 62. The direct current power supply in this embodiment, shown for purposes of illustration only, has been comprised of a direct current supply power contact shoe 70 which rides upon the surface of a third rail or direct current power supply rail. While this embodiment shows a third rail arrangement, it should be understood that the direct current supply may be constituted by any sufficient direct current supply whether carried by the train or delivered from the wayside. If the power supply should be alternating current, the inverter shall be assumed to have a rectifier unit included in its input circuit. It should be understood that the propulsion induction motor 81 is a three-phase motor and therefore each of the alternators 38 and 40 of the alternator means 37 has three outputs. For example, the first alternator 38 has output leads 57, 58 and 59, while the second alternator 40 has output leads 25, 26 and 27, which leads in properly connected pairs provide the output connections. These outputs from the alternators 38 and 40 are delivered to the frequency selector means 39 and there the power is selectively connected to electrical leads 63, 64 and 65, which electrical leads are in turn connected to the propulsion induction motors, one propulsion induction motor 81 being depicted here in FIG. 3.

It should be understood that the alternators provide only a control function to determine the commutation rate at which the direct current power from the power supply 61 is delivered to the three-phase induction motor 81. To put it another way, the frequencies that are delivered from the alternators 38 and 40 provide the timed sequence for the delivery of the direct current power from the direct current power supply 61. Furthermore, as has been set forth earlier, each of the inverters 95, 96 and 97 is of the same type set forth in detail in my copending application for Letters Patent of the United States, Ser. No. 492,008, filed Oct. 1, 1965, for a Train Speed Control System. The propulsion induction motor 81 has a motor winding 86 which has two different pole per phase connections. This graphical designation of the multi-winding, multi-pole per phase arrangement is the same as that depicted in the Standard Handbook for Electrical Engineers on page 706, 7th edition of this handbook. Accordingly, the terminals 1, 2 and 3 of the propulsion motor 86 when connected to the inverter provide a delivery of power from the direct current power supply through the inverters 95, 96 and 97 to the pole per phase connections 1, 2 and 3 of the motor winding 86. At the same time that this occurs the pole connections 4, 5 and 6 of motor 86 are connected together. When the windings 4, 5 and 6, which represent a 4-pole per phase motor, are connected, the terminals 1, 2 and 3 of the motor 86 are no longer interconnected and you have the second range of pole per phase operation of which the motor is capable.

In this particular embodiment the winding terminal connections 1, 2 and 3 provide an 8-pole per phase induction motor while the connections 4, 5 and 6 provide a 4-pole per phase motor. In this embodiment the train speed responsive means 42 and its relay LH provide a control function for both the frequency selector means 39 and the pole per phase selection means 71. This is done via the front contact $a$ of relay LH, which relay LH picks up upon the train reaching a predetermined speed. A circuit is completed over the front contact $a$ of the relay LH from the battery terminal B and thence along the lead 60 to the repeater relay 69 designated LHP and finally to battery terminal N. The repeater relay LHP controls the pole per phase selection and this only occurs when the train has reached a predetermined speed.

The operation of the system will now be described, as the train travels from a low speed increasing through to its maximum speed. For example, when the rails are receiving a signal in the range of zero to 30 cycles per second from the wayside transmitter 16, via the electrical leads 17 and 18, and the primary winding 19 of the impedance bond 14, this signal is then picked up by the train frequency detector coils 78 and 79, which in turn deliver this wayside signal of a predetermined frequency to the frequency responsive split phase motor 35, which in turn drives this split phase motor 35 at a speed proportional to the frequency received by the frequency detector 21. In the first range of speed it will be seen that the alternator 40 which is being driven via the mechanical link 45 will produce an output which is twice the output being delivered rotationally to the split phase induction motor 35. The output from the alternator 40 therefore will have a frequency representation which is twice that being delivered from the wayside, and the frequency of the signal being delivered over the electrical leads 25, 26 and 27 will be twice that being delivered from the wayside. This signal, or set of three signals, will then be delivered over the electrical leads 25, 26 and 27 to the frequency selector means 39. In this first mode of operation, when the train is below a predetermined speed, the relay LH is in its released position and therefore the signal being delivered from the alternator 40 over the lines 25, 26 and 27 will respectively pass over the back contact $b$ of the relay LH, the electrical lead 63, thence through the electrical lead 83, and next over the back contact $a$ of the repeater relay LHP, and finally to the terminal 1 of the propulsion induction motor 86. It should be recognized that while the relay LH is in its released position, the repeater relay LHP is also in its released position.

The second lead from the alternator 40, here designated lead 26, will deliver its timed sequence spaced signal of the given frequency over the back contact $c$ of relay LH via the electrical lead 64, thence through electrical lead 84, and the back contact $b$ of the relay LHP, and thence to the terminal 2 of the propulsion induction motor 86.

The third phase of the three-phase signal being delivered from the alternator 40 will be delivered over the electrical lead 27, and this signal will travel over the back contact $d$, the electrical lead 85, over the back contact $c$ of repeater relay LHP and thence to the terminal connection 3 of the propulsion induction motor 86.

While power is being delivered to the winding connections 1, 2 and 3, the winding connection terminals 4, 5 and 6 are electrically interconnected, the terminal 4 being electrically interconnected to the terminals 6 and 5 over the back contacts $e$ and $d$ of repeater relay LHP. This has been done in accordance with the standards set forth in the Handbook for Electrical Engineers noted above.

As the speed of the train increases and reaches a predetermined speed, by way of example here, 30 miles per hours, the train speed responsive means 42 will produce an electrical signal from its train speed detector 48, which electrical signal will be transferred via the electrical lead to relay LH which will then pick up. When this relay LH picks up at 30 miles per hour, a circuit is then closed between the battery terminal B over the front contact $a$ of relay LH and through the winding of the repeater relay LHP to battery terminal N. The repeater relay LHP will then be picked up and the following operation will occur. With relay LH picked up at 30 miles per hour and a frequency being delivered from the wayside in a range of 30 cycles per second to 60 cycles per second, the output speed of the propulsion induction motor 86 will then increase as a direct function of the frequency being delivered by the alternator 38, which alternator's output is delivered to the frequency selector means 39. As noted, the alternator 38 has three output leads 57, 58 and 59. With the relay LH picked up, a circuit is completed to the propulsion induction motor 86 over the following electrical leads. Electrical lead 57 from the alternator 37 completes a circuit with the front contact $b$ of the relay LH, thence over the electrical lead 63 through the electrical lead 83, thence over the front contact $a$ of the repeater relay LHP to the terminal 6.

The electrical lead 58, from the alternator 38 will then form a completed circuit over the front contact c of the relay LH, thence over the electrical lead 64, the electrical lead 84, thence over the front contact b of repeater relay LHP to the terminal connection 4 of the propulsion induction motor winding 86.

The third and final electrical connection from the alternator 38 is designated by the lead 59 and the signal that appears over line 59 will pass through the front contact d of the relay LH, thence over the electrical lead 85, and thence over the front contact c of repeater relay LHP to the terminal 5 of the propulsion induction motor winding 86.

As has been noted earlier, since the alternator 38 is a 2-pole alternator, the frequency of the signal being delivered via the electrical leads 57, 58 and 59 will be directly proportional to the frequency of the signal delivered from the wayside transmitter 16, and this frequency will be in a one-to-one basis if the split phase motor 35 has two poles per phase. Therefore, with reference now again to FIG. 2, it will be seen that when a train reaches a predetermined speed of 30 miles per hour, the relay LH is then picked up and the second range of speed control is entered, whereupon the variations in the wayside transmitter frequency between 30 cycles per second and 60 cycles per second produce a change in the output r.p.m. of the propulsion induction motor 81, which is directly a function of this change in frequency, namely, the greater the frequency delivered to the wayside in excess of 30 cycles per second the greater the output speed of the propulsion induction motor 86. And by the same token, should the signal decrease from the wayside to indicate a more restrictive condition, this would cause a reduction in the frequency delivered by the alternator 38 which in turn would reduce the ultimate speed of the propulsion induction motor 81, As the speed of the train dropped below 30 miles per hour, the exemplary speed selected for this embodiment, the second alternator 40 with its 4-pole arrangement would take over and the speed of the train propulsion motor 81 would then be controlled by the wayside transmitter frequency signal. Should this signal be reduced to zero, the train of course without regard to what speed the train was operating at, would brake or reduce its speed to a stop because of the absence of any speed control signal from the wayside.

It should be understood that the embodiment of the invention as set forth in FIGS. 1 through 3 permits the variable speed control of the train and the system in this embodiment makes special provision for operating the train at lower speeds. This special provision takes the form of the alternator 40 which is a 4-pole permanent magnet alternator which in effect doubles the frequency being delivered to the propulsion motor 81, and in doubling the frequency permits a more efficient operation of the electric propulsion motor 81. Of course, it is recognized that while the frequency has been doubled by the alternator 40, the number of poles per phase are also doubled. It will therefore be seen that this arrangement provides for the efficient operation throughout the variable frequency spread from zero to 60 cycles per second. It should be further understood that the range of frequencies from zero to 60 cycles per second is intended to be exemplary and not limitative of the invention for any range of frequencies may be selected and still remain within the scope of the invention.

Reference is now made to FIG. 4 which illustrates a second embodiment of the invention. In this embodiment the principal distinguishing features reside in the manner in which the plurality of alternators present in this embodiment and their differing frequency outputs are selected to be applied to a particular pole per phase connection of a propulsion induction motor. In this embodiment the selection of the frequency delivered from the alternators, as well as the pole per phase selection, is determined purely by the predetermined selection of differing frequency ranges. These differing frequency ranges are so selected that maximum efficiency is attained by the propulsion induction motor. It should be understood that frequency ranges set forth with reference to the following description are cited for purposes of describing the embodiment and are in no way intended to limit the invention to any particular series of ranges, or combination of frequency ranges and pole per phase connections of the propulsion induction motor.

Accordingly, specific reference is now made to FIG. 4 in which when like reference numerals may be applied to elements of the system that have already been utilized with reference to FIGS. 1 through 3, this description will also utilize the same reference numerals to aid in an understanding of the system to be described. Therefore, it is seen that train 11 is operating on the rails 12 and 13 and this train 11 in the particular block diagram of FIG. 4 is moving to the left as viewed in FIG. 4. The train 11 carries a train speed detector 117 and a frequency detector 21. Immediately ahead and to the left of the train there is depicted an impedance bond 14 which electrically interconnects the rails 12 and 13. The function of the impedance bond 14 is the same as that which has been described with reference to FIGS. 1 and 3. Immediately adjacent the impedance bond and as a part thereof is the primary winding 19 which has leads 17 and 18 which electrically interconnect the wayside transmitter 16 to the primary winding 19. The wayside transmitter 16 delivers to the primary winding a signal of variable frequency dependent upon the traffic conditions and the maximum permissible speed allowable by the train. These signals of variable frequency are impressed in the rails 12 and 13, and for purposes of this description the rails 12 and 13 will be considered a transmission link between the train frequency detector and the wayside transmitter 16. It should be understood, of course, that the invention also contemplates as within its scope the speed control of any train without the utilization of this particular mode of transmission link. Therefore, conventional wayside radio transmitters may deliver to the train in certain instances information with reference to the speed at which the train is to travel, thereby obviating the need for the rail transmission link which has been described above, and which is shown in the preferred embodiment.

The variable frequency signal delivered from the wayside transmitter 16 via the transmission link which comprises the rails 12 and 13 is received by the frequency detector 21 which is carried by the train. This frequency detector 21 delivers a signal via the electrical leads 22 and 23 to the first frequency responsive means 106. This first frequency responsive means 106 has depicted therein a plurality of schematically illustrated alternators with varying outputs with reference to the variable frequency signal delivered to the frequency responsive means 106. These different alternator outputs are selectively interconnected by a frequency selector means 140. There is also driven by the first frequency responsive means a second frequency responsive means through a mechanical output 45 from the first frequency responsive means 106. This second frequency responsive means 112 has two sets of outputs, the first set of outputs 113, 114, 115 being delivered to a command speed vs. train speed comparator 116, which will be discussed in more detail with reference to the following figures. The second output from the second frequency responsive means 112 is present in the form of outputs 132, 133 and 134, which outputs in turn are fed directly to the frequency selector means 140 and simultaneously the outputs from the second frequency responsive means 112 via the outputs 136, 137 and 138 are fed to the pole per phase selection means 180 where the pole per phase selection of the propulsion induction motor follows a pattern which corresponds to the frequency selected by the frequency selector means 140. In other words, where there is going to be utilized a 16- pole per phase connection to the propulsion induction motor 190, there would be an alternator output selected for a lower frequency range, for example, zero to 20 cycles per second, which signal of course would be increased eight times and delivered via the output 110 from the first frequency responsive means 106.

The output 110 would be delivered to the frequency selector means 140. The selection of this particular output from the first frequency responsive means would therefore drive the inverter means 160 via the outputs 141, 142 and 143 from the frequency selector means 140 at the rate which would permit the passage of direct current power from the direct current power supply 61 via the terminal electrical lead 62, through the inverter to the propulsion induction motor 190. It should be recognized that the frequency selector means permits the selection of different frequencies to be delivered to the inverter means 160, and it is this different series of ranges of frequencies that bring about a timed sequence application of direct current power to the inverters, which inverters deliver an alternating current of appropriate phase to the propulsion induction motor to thereby vary the speed of the propulsion induction motor.

There is included in this embodiment the control to be discussed now. This control takes the form of a frequency responsive brake and power control unit 170 which is interposed between the inverter means 160 and the pole per phase selection means 180. While the first embodiment shown in FIGS. 1 and 3 does not contain this control, it should be understood that FIGS. 1 and 3 may readily be modified to include such a control feature. The frequency responsive brake and power control is in the form of a switch which permits the passage of the output from the inverter 160 via the outputs 165, 166 and 167, through the frequency responsive brake and power control unit 170, and thence to the output leads 175, 176 and 177 to the pole per phase selection means where the power from the inverter is delivered from the pole per phase selection means 180 via the electrical leads 185, 186 and 187 to the propulsion induction motor 190, and the appropriate pole per phase connection and winding of the propulsion induction motor 109.

This frequency responsive brake and power control 170 has a pair of electrical leads 29 and 30 which are connected to the first frequency responsive means 106. It can therefore be seen that when a speed control signal from the wayside transmitter appears in the rails and is detected by the frequency detector 21, a signal will therefore appear in the electrical leads 22 and 23 and if this signal is of the proper frequency there will also appear simultaneously in the electrical leads 29 and 30 a signal to actuate the frequency responsive brake and power control unit 170. Upon the actuation of the frequency responsive brake and power control unit 170 the passage of direct current power of the correct triggering frequency will be permitted and this power will pass from the inverter through the frequency responsive brake and power control 170 and thence through the pole per phase selection means to the appropriate pole per phase connection of the propulsion induction motor 190. The absence of any speed control signal from the wayside transmitter 16 of course will result in the absence of any useable signal from the frequency detector 21, and this will result in the absence of a signal in the electrical leads 29 and 30 which will not permit the frequency responsive brake and power control unit 170 to pass power from the inverter means 160 through the frequency responsive brake and power control 170 to the pole per phase selection means and thence to the motor.

This is therefore an inherent fail-safe feature of this invention that provides for the most restrictive speed control to take place in the absence of any speed control signal from the rails as might happen where there is a short in the system, a broken rail, or under normal traffic conditions, the headway has decreased between trains to a point where the train 11 must apply a braking action to bring the train to a halt before coming in contact with the rear of the next train, not shown to the left in this figure.

This second embodiment of the invention also includes what has been partially described earlier as a command speed vs. train speed comparator 116. This command speed vs. train speed comparator 116 receives a signal or an output from the train speed detector 117, which signal or output is delivered over the connection 118 to the command speed vs. train speed comparator 116. This comparator 116 therefore will permit on the train a comparison of the actual command speed delivered from the wayside vs. the actual speed of the train to permit the additional check of train operation by an operator who travels with the train. It should be understood of course that while this invention includes this train speed comparator, the absence of this feature may very well occur where this system is utilized in a fully automated environment which obviates the need for any operator on the train to check the command speed from the wayside with the actual speed of the train.

Figure 6:
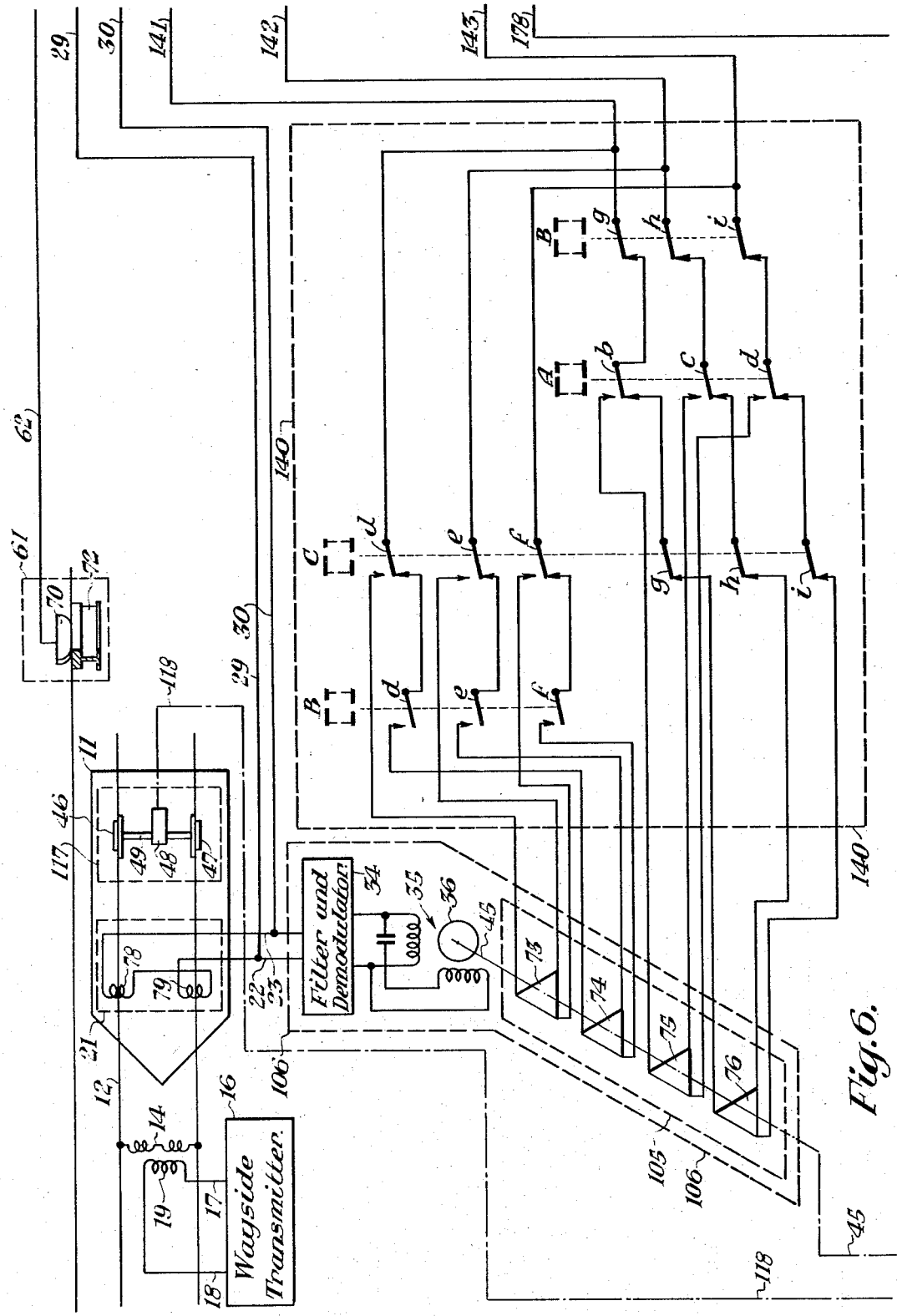
Figure 7:
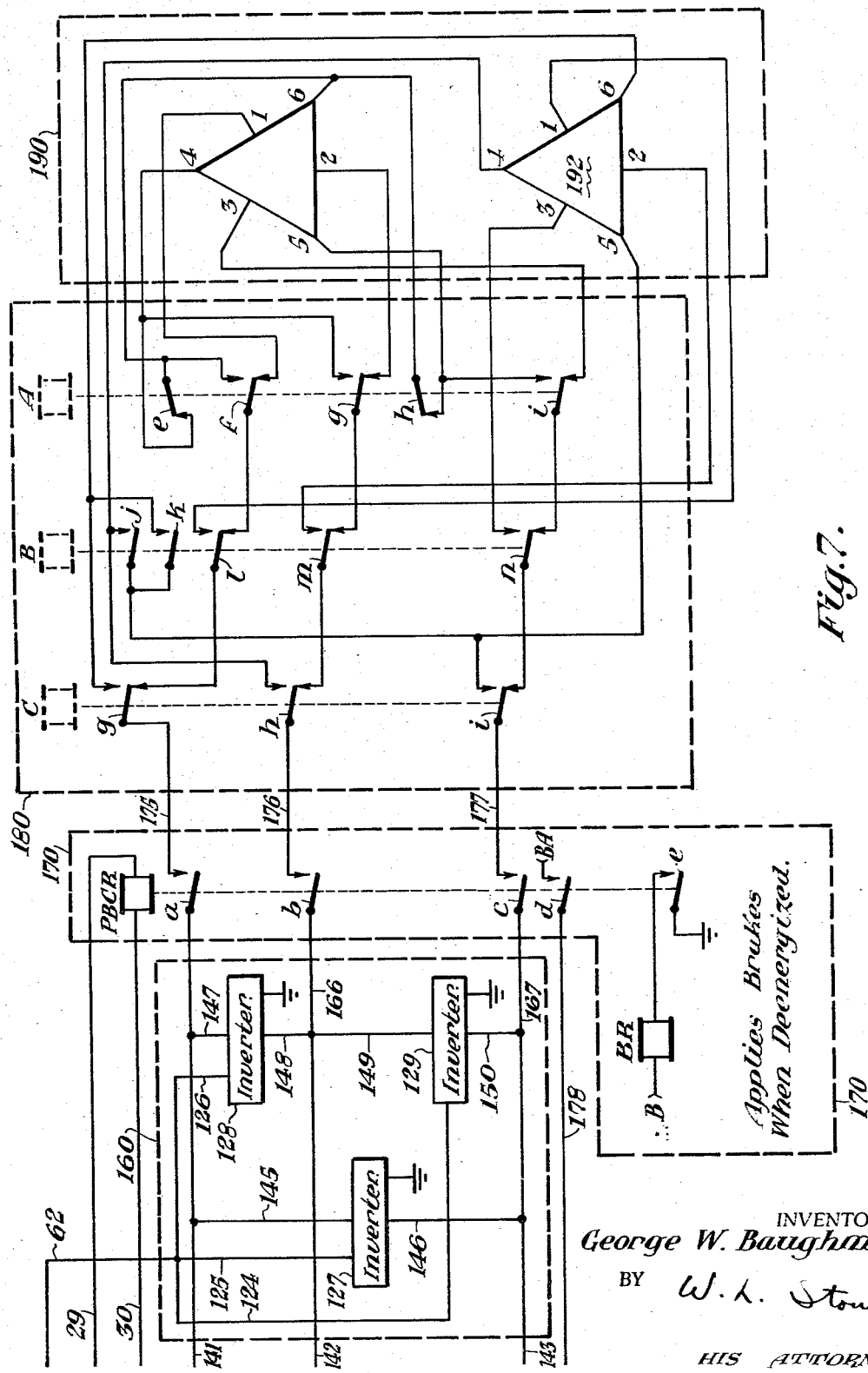

FIG. 5 sets forth the physical arrangement which FIGS. 6, 7 and 8 must conform to in order that the full embodiment with all the electrical connections of FIG. 4 functions in a manner essential to this invention.

In the physical arrangement shown in detail in FIGS. 6, 7 and 8 it should be recognized that wherever practical those elements recited with reference to and illustrated in FIG. 4 have been shown outlined in a dotted fashion in these figures.

Therefore, with specific reference to FIG. 6, the train 11 which travels upon the rails 12 and 13 receives its command signals of variable frequency from the wayside transmitter 16, here depicted in the upper left-hand corner of this figure. The train 11 has carried thereon the frequency detector 21 which has a pair of coils 78 and 79 inductively mounted on the train over the rails to receive the signal from the wayside transmitter after the signal has been impressed in the rails 12 and 13. These coils 78 and 79 detect the presence of a signal delivered by the transmitter 16 and deliver this signal via the electrical leads 22 and 23 to the first frequency responsive means 106. This first frequency responsive means 106 has as an integral part thereof a split phase induction motor 35, which split phase induction motor 35 has a filter and demodulator 34 to take the variable frequency signal delivered from the frequency detector 21 and convert this into the appropriate filtered and demodulated signals to be delivered to the split phase induction motor to drive this split phase induction motor at a speed directly proportional to the frequency delivered from the wayside. This split phase induction motor has a rotor 36 and a mechanical link or mechanical output 45 from the rotor 36, which mechanical output 45 in turn drives a series of alternators 73, 74, 75 and 76. These alternators are respectively a 2-pole alternator, a 4-pole alternator, an 8-pole alternator, and a 16-pole alternator. All of the alternators are of the permanent magnet type for purposes of setting forth a preferred type of alternator. It should be understood that other forms of alternators may be employed as long as the outputs from the alternators bear a distinctive proportional output with reference to a particular controlled input.

The alternators 73, 74, 75 and 76 form what is termed an alternator means 105. Each of the outputs from the alternator means 105 is delivered to the frequency selector means 140, depicted immediately to the right in FIG. 6. This frequency selector means 140, when actuated, will select one of the outputs being produced by the alternator means 105 and the selection of the particular output from the alternator means 105 will be dependent upon the frequency range at which the command signal from the wayside of variable frequency is being delivered to the train. At the lower end of the mechanical link 45 of the rotor 36, there is depicted a downwardly extending extension of this mechanical link 45 into FIG. 8 of the drawings where this mechanical link 45 drives or enters a second frequency responsive means 112, and this mechanical drive 45 turns a centrifugal speed responsive mechanism 119, which speed responsive mechanism has a particular function which will now be described. As the speed of split phase induction motor 35 increases as a result of the increase in frequency delivered from the wayside transmitter 16, the variable speed signal drives the split phase induction motor and in turn the centrifugal speed responsive mechanism 119, which causes the mechanical link 120 to pivot about the point 121, and in so doing moves a second mechanical contact arm 122 through an arc depicted by arrow 88. It can therefore be seen that as the speed of the split phase induction motor increases, the centrifugal speed responsive device will cause the mechanical link 120 to move downward with the simultaneous movement upward of the contact arm 122.

The contact arm 122 has connected thereto a battery supply terminal B through an extendable electrical lead 123. Accordingly, when the frequency delivered from the wayside is sufficient to cause the split phase induction motor to drive the speed responsive centrifugal device at a rate sufficient to cause the contact arm 122 to move upward into contact with the contact a of the contact arm arrangement, a circuit will be completed from the battery terminal B, through the extendable electrical lead 123, the contact arm 122 and its contact a, and the winding of relay A, the back contact c of the relay B, the back contact c of relay C, thence over the electrical lead 113, and finally to the train speed comparator 116 which is grounded.

It can be seen, therefore, from a study of the second frequency responsive means 112 that as the contact arm 122 moves along the arc described by the arrow 88, a series of different contacts will be made with the points a, b and c as the contact arm 122 moves along the arc described by the arrow 88. Each of these contacts will represent the beginning of a frequency range of operation, and it will be understood that as the train speed command signal from the wayside increases, the speed at which the centrifugal responsive device 119 functions will cause the upward arcuate movement of the contact arm 122, which will initiate a completed circuit through each of the contacts a, b and c of the arm 122 as the command signal from the wayside is varied over a range which, for purposes of this discussion, is considered to be zero to 60 cycles per second. Accordingly, the second frequency responsive means has the following series of ranges: During the time the frequency delivered from the wayside is below a predetermined frequency, for example 7.5 c.p.s., the contact arm 122 will not move beyond its contact a, which is the first contact, and therefore the first range of train speed operation will be present. As the frequency from the wayside increases and reaches 7.5 cycles per second, the centrifugal speed responsive device 119, which is driven at a rate dependent upon the speed of the split phase induction motor 35, will cause the contact arm 122 to complete a circuit over the contact a of the contact arm 122, and this will permit the beginning of a second range of speeds. As the command frequency from the wayside increases between 7.5 and 15, this signal will cause the contact arm 122 to move between the first contact a and the second contact b. It should be noted that the relay A is a slow-to-release relay, and this will provide the essential continuity of switching action which will be evident when a further study is made of the manner in which the relays B and C of the second frequency responsive means are actuated.

Therefore, returning once again to the operation of this second frequency responsive means 112, once the contact arm 122 has passed the first contact a and has progressed to the contact b, the relay A, which is slow-to-release, will have maintained its contact a in a picked-up position and therefore a circuit will have been completed from the battery terminal B, through the electrical lead 123, the contact arm 122, the contact b, the front contact a of the relay A, the winding of the relay B, which energizes relay B, the back contact b of relay C, the electrical lead 114, and the train speed comparator 116 to ground.

Once the train has received a command signal from the wayside which causes the centrifugal speed responsive mechanism 119 to bring the contact arm 122 into its second position or range which is in contact with the contact b, the relay A drops away, breaking the front contact a, but the relay B which has been energized and picked up its contacts b and c, provides a completed circuit from the battery terminal B over the electrical lead 123, the contact arm 122, the second contact b, the front contact b of relay B, the winding of relay B, the back contact b of the relay C and the electrical lead 114 and the speed comparator 116 to ground. It should be noted that when the relay B picks up the contact c, which normally rests on the back contact c of the relay B, the circuit to relay A is broken and can no longer be actuated as its power supply circuit is broken by the opening of the back contact c of the relay B.

In a similar manner, when the signal delivered from the wayside is of a sufficient magnitude to cause the centrifugal speed responsive mechanism to rotate at a speed adequate to cause the contact arm 122 to move away from its contact b and come in contact with the contact c, which is the third contact depicted, a circuit will be completed from the battery terminal B over electrical lead 123, the contact arm 122, the front contact a of relay B, which relay it should be noted is a slow release relay which permits the completion of a stick circuit over this front contact a of relay B, the winding of relay C, the electrical lead 115 and the speed comparator 116 to a ground.

In a manner similar to that with reference to relays A and B, once this circuit has been completed and relay C picks up and relay B has dropped away, a circuit is now completed from the battery terminal B, through the electrical lead 123, the contact c of the arm 122, the front contact a of relay C, the winding of relay C, the electrical lead 115, and the train speed comparator 116 to a ground. It will be noted that when relay C is picked up, the contacts b and c of relay C are picked up and this insures that the circuits between the relays A and B are broken.

It should be recognized that when a circuit is completed from the battery terminal B through electrical lead 123 and the contact arm 122 to any of the contacts a, b or c of the contact arm 122, this will result in the appearance of an electrical signal in the electrical leads 113, 114 and 115. Each of these signals delivered to the train speed comparator 116 will produce in the train speed comparator 116 an indication on the scale designated "Maximum Advance Speed." This maximum advance speed is the maximum advance speed allowable as determined by the frequency delivered from the wayside.

In addition to the inputs 113, 114 and 115 of the train speed comparator 116 there is an electrical input in the form of electrical lead 178. The lead 178 is connected to battery terminal B over the front contact d of the relay PBCR, which relay is energized initially when a signal from the wayside is commanding the first range of speed. Therefore, the presence of an electrical signal from the battery terminal just noted will cause an indication of the maximum permissible advance speed for the first range of speed. Accordingly, for purposes of describing this invention, when there is no signal present on either lead 113, 114, or 115, and the relay PBCR is energized, the maximum speed allowable would be indicated as 30 miles per hour, and when a signal appeared on lead 113, the maximum allowable speed would then be, for example, 40 miles per hour, and when a signal appeared on lead 114, the maximum permissible speed would be 50 miles per hour, and when a signal appeared on lead 115, this would permit a maximum speed of, for example, 60 miles per hour.

It would be noted that the selection of maximum advance speeds for the train dependent upon the presence or the absence of a signal in the electrical leads 113, 114 115, and 178 is within the descretion of the individuals utilizing the invention being described and these ranges may be selected dependent upon the efficiency sought to be attained in the electric propulsion induction motors. Accordingly, the speed ranges given are exemplary and are not intended to be limitative of the invention but are sent forth only for purposes of explaining one mode of operation.

It will be noted that the relays A, B and C depicted in the second frequency responsive means 112 are shown in heavy lines in FIG. 8, while the relays A, B and C are shown dotted in FIGS. 6 and 7 for purposes of aiding in the explanation and the description of the operation of the contacts as they appear in these other figures. It should be recognized, of course, that the electrical supply leads to the relays A, B and C shown dotted in FIGS. 6 and 7 have been excluded for purposes of description only and that the relays A, B and C, shown in FIG. 8, depicted in the second frequency detector 112, in fact operate all the contacts designated in the other two FIGS. 6 and 7.

There has also been depicted on the train 11 a train speed detector 117. This train speed detector may be comprised of a pair of train wheels 46 and 47 which are interconnected by an axle 49. Mounted on the axle 49 is a speed detector 48 of a conventional type which will deliver either a mechanical output via the output 118 from the speed detector 48 or an electrical output dependent on the type of speed selector utilized in the speed detector mechanism 48. Accordingly, the output from the speed detector 48 is delivered via the output linkage 118 to the train speed comparator 116 where there is registered the actual speed of the train in the lower portion of the train speed comparator 116.

As has been previously indicated, the first frequency responsive means 106 has a plurality of alternators 73, 74, 75 and 76. Each of these alternators of the alternator means 105 has three distinct outputs. Each of these outputs is fed directly into the frequency selector means 140 depicted in FIG. 6 shown in dotted outline. The frequency selector means 140 is comprised of a plurality of relay contacts controlled by relays A, B and C. These relays are shown in dotted fashion in this figure for reasons set forth earlier. Accordingly, it will be seen that the alternator 76 provides an eight-to-one output compared to the signal input, which signal input takes the form of a rotational input delivered from the split phase induction motor 35. This output from the alternator 76 will be delivered to the frequency selector 140 and in being so delivered this eight-to-one output from the alternator 76 will pass over the back contacts g, h and i of relay C, thence over the back contacts b, c and d of relay A, and thence over the back contacts g, h and i of relay D, whereupon the three signals being delivered by the alternator will appear in electrical leads 141, 142 and 143 to be delivered to the inverter 160. In a similar manner, when the relay A is in a picked-up position, the outputs from the alternator 75 will be delivered respectively to the inverter 160 over the front contacts b, c and d of relay A, over the back contacts g, h and i of relay B, and thence to the electrical leads 141, 142 and 143, whereupon this three-phase signal with a frequency having a ratio of four-to-one with respect to the input will be delivered to the inverter 160.

In a similar manner, the alternator output from alternator 74, which is producing an output of a two-to-one ration, compared to the input, will be delivered to the inverter 160 when the relay B is in picked-up condition, and this signal from the alternator 74 will then be delivered to the inverter over the front contacts d, e and f of relay B, thence over the back contacts d, e and f of relay C, and finally to the electrical leads 141, 142 and 143 which enter the inverter 160.

For the final range of speed when the train is operating in its maximum speed, the output from the alternator 73, which has a frequency ratio of one-to-one with respect to the input, will be delivered to the inverter 160 over the front contacts d, e and f of relay C when relay C is picked up, and thence through the electrical leads 141, 142 and 143 to be delivered to the inverter where these signals will control the rate and time sequence with which the inverter 160 will permit the direct current power supply 61 to pass power to the electric propulsion motor 190. In this instance, as in the first embodiment described, the direct current power supply is illustrated as being comprised of a direct current supply contact shoe 70 which is riding along the surface of a direct current power supply rail 72. An electrical lead 62 leads from the contact 70 and thence to the inverter 160.

The inverter 160 is of the same type described with reference to FIG. 3, and in this embodiment is comprised in a similar manner of inverters 127, 128 and 129. These inverters are connected respectively across the input electrical leads 141, 142 and 143 in the following manner: Inverter 127 is connected across the electrical leads 141 and 143 via the electrical leads 145 and 146. The inverter 128 is electrically connected across the electrical leads 141 and 142 via the electrical leads 147 and 148, while the last inverter 129 is connected across the electrical leads 142 and 143 via the electrical leads 149 and 150. Each of the inverters is supplied in parallel by line 62 from the direct current power supply 61 and each of these inverters 127, 128 and 129 has a separate supply lead 124, 125 and 126 which connects with the direct current supply lead 62. Each of the inverters has a grounded portion as designated in this FIG. 7. Accordingly, it is seen that one inverter unit can supply all the needed system capacity for delivering the signal from the alternator means 105 via the frequency selector means 140 to the pole per phase selection means 180 shown in the middle of FIG. 7, and discussed briefly with reference to FIG. 4.

Half-way between the inverter 160 and the pole per phase selection means 180 there is positioned a frequency responsive brake and power control unit 170, which has leading therefrom electrical leads 29 and 30 which are connected to the filter and demodulator 34. It should be understood that when a train speed command signal appears on the electrical leads 22 and 23 and filter demodulator 34 there simultaneously will appear a signal in the electrical leads 29 and 30 which are fed directly to the power and brake control relay PBCR. Upon the actuation of this relay the contacts a, b, c, d and e of relay PBCR will come to the picked-up position with the contacts a, b, c. d and e of relay PBCR resting on the front contacts, thereby permitting the passage of power from the inverter 160 via the electrical leads 165, 166 and 167 through the frequency responsive brake and power control unit 170 to the electrical leads 175, 176 and 177 respectively which enter the pole per phase selection means 180. It will be noted in the lower portion of the frequency responsive brake and power control unit 170 there is a brake relay BR which will permit the actuation of the brakes whenever this relay is deenergized. It will therefore be seen that additional fail-safe operation is provided for when no signal appears in the rails, and accordingly does not appear in the electrical lead 28 or 29, no signal will be present to control the actuation of the power and brake control relay PBCR. Therefore, the relay PBCR will not pick up and the brake relay BR will be deenergized and the train will be brought to a halt. In the normal operation of the system, the contact e of the relay PBCR will complete a circuit from the battery terminal B through the winding of the brake relay BR, and the front contact e of relay PBCR to ground which will thereby cause the release of the brakes and the system will be able to operate upon command from the wayside transmitter at any of the predetermined frequencies being delivered to the train.

The pole per phase selection means 180 is controlled by a series of relays A, B and C, shown dotted in this FIG. 7, but as noted earlier these relays A, B and C as shown here are intended to actuate their respective contacts whenever the relays A, B and C of FIG. 8 have been actuated.

The propulsion induction motor 190 is comprised of a pair of windings 191 and 192, which windings form in effect separate motors but which in a practical manner may be housed in one unit. Each of the windings 191 and 192 has a number of connections which permit different pole per phase connections to obtain different output speeds from the propulsion motor. Accordingly, the winding 192 which represents one winding of the motor has in this example the connections 1, 2 and 3 providing a 16-pole per phase arrangement which will be delivered power at a rate determined by the alternator 76. In a similar manner, the connections 4, 5 and 6 of the winding 192 will have an 8-pole per phase configuration and these windings in this connection will be connected through the pole per phase selection means 180 and the inverter 160 to the frequency selector means 140, and thence to the alternator output of alternator 75 of the alternator means 105. It should be noted that both the windings 192 and 191 are of the type described with reference to the windings illustrated in FIG. 3 and in accordance with the Standard Handbook for Electrical Engineers noted earlier.

The winding 191 of the motor has, by way of example in this embodiment, two sets of connections, the first being through the connections 1, 2 and 3 of the winding to provide a 4-pole per phase connection, while the connections 4, 5 and 6 provide a 2-pole per phase connection which will be utilized when the train is operating at its maximum rate of speed.

It can be seen from this particular arrangement that there are in decreasing order a 16-pole per phase winding, an 8-pole per phase winding, a 4-pole per phase winding, and a 2-pole per phase winding to be utilized by the train in its propulsion system, and the higher the frequency delivered from the wayside the lower the number of poles per phase will be utilized. Accordingly, where the speed command from the wayside indicates a slow speed is necessary, the frequency being delivered from the alternator means 105 will permit the passage of a multiplied frequency or a multiple of the frequency being delivered from the wayside and this will be applied to a winding connection of the electric propulsion motor 190 which will permit the most efficient operation of the motor at the lower frequency from the wayside.

In other words, where the frequency from the wayside is low and accordingly the efficiency of the motors would not be as great as desired, these frequencies have been multiplied by the alternator means 105 to provide an increased frequency to be delivered to the propulsion motor. This increase in frequency has been compensated for by the simultaneous increase in pole per phase connections of the motor to produce the desired efficient operation of the propulsion drive of the train.

The operation of the system will now be described. The description which follows should be taken in conjunction with the graph shown in FIG. 9 as the operation of the train will be described as it increases in speed from a stopping position through to its maximum speed. It should be understood that the description which follows may of course be varied depending upon the traffic conditions and the speed command essential for safe train operation. Accordingly, with reference to FIG. 9, there is shown the frequency in cycles per second delivered from the wayside by the wayside transmitter 16 to the primary winding 19 of the impedance bond 14 and thence to the rails 12 and 13 where this variable frequency signal is received by the train 11, the frequency detector coils 78 and 79 of the frequency detector 21 picking up the signal from the rails 12 and 13. In a first mode of operation we will presume that the frequency delivered from the wayside varies from zero to 7.5 cycles per second. During this range of operation for the most efficient train propulsion system, for purposes of explanation, the propulsion motor connection selected has been a 16-pole per phase connection while the alternator output selected will be that of a 16-pole alternator. It can be seen from the graph that when this combination is used, there will be a smoothly varying linear speed increase of the propulsion induction motor from zero up to and including approximately 450 r.p.m. Accordingly, as the frequency is received by the frequency detector 21 and a signal appears in the electrical leads 22 and 23, this signal in turn will enter the filter and demodulator of the split phase induction motor 35 which in turn drives the rotor 36 and its mechanical linkage 45, which mechanical linkage in turn drives the permanent magnet alternators 73, 74, 75 and 76.

It will be noted that since the speed of the split phase induction motor 35, which is determined by the frequency received from the wayside, is of a value such that the rotational speed delivered through the mechanical linkage 45 to the centrifugal speed responsive mechanism 119 is of a low value, the contact arm 122 will not come into contact with the contact *a* of the contact arm 122 until the frequency delivered from the wayside increases to 7.5 cycles per second. During this first range of frequency the contact arm 122 of the second frequency responsive means 112 will not then complete a circuit with any of the relays A, B or C of the second frequency responsive means 112. Therefore, the only control signal to the propulsion induction motor that will be useable will be from alternator 76 of the alternator means 105. Accordingly, the output from the alternator 76 will pass over the three leads that extend from this alternator and this frequency signal will pass over the back contacts *g, h* and *i* of the relay C, thence over the back contacts *b, c* and *d* of the relay A, back contacts *g, h* and *i* of the relay B, and thence through the electrical leads 141, 142 and 143, respectively, where this signal from the alternator will drive the inverters 127, 128 and 129 at a rate directly proportional to the frequency being delivered by the alternator 76. This alternator output, as has been noted, is eight times that of the input or 60 c.p.s. Accordingly, the inverters 127, 128 and 129 will permit the passage of the direct current power from the direct current power supply 61 over the electrical lead 62 through the respective inverters 127, 128 and 129. This power will be delivered in a proper time and phase sequence over the electrical leads 165, 166 and 167 from the inverter 160, and this power will pass over the front contacts *a, b* and *c* of the power and brake control relay PBCR, thence through the electrical leads 175, 176 and 177 and into the pole per phase selection means 180 where this power will then be delivered over the back contacts *g, h* and *i* of the relay C, thence over the back contacts *l, m* and *n* of the relay B, and finally over the back contacts *f, g* and *i* of the relay A, to be delivered to the connections 1, 2 and 3 of the winding 191. It will be noted that pursuant to the conventional technique set forth in the Standard Handbook for Electrical Engineers noted earlier, terminals 4, 5 and 6 of the winding 191 have been electrically interconnected. Terminal 4 of the winding 191 is connected over the back contact *e* of the relay A, to the terminal 6, and the terminal 6 is connected to the terminal 5 over the electrical lead emanating from terminal 6 over the back contact *h* of relay A, and then to the terminal 5.

It will be seen thus far that when a train has received a command signal in the frequency range between zero and 7.5 cycles per second, the 16-pole per phase connection of the winding 191 is being utilized and the propulsion motor driving the train will respond to variations of frequency from the wayside between zero and 7.5 cycles per second to vary the speed of the train in this frequency range.

When the command speed signal from the wayside of variable frequency reaches 7.5 cycles per second, the actual mechanical output from the linkage 45 of the split phase induction motor 35 will drive the centrifugal speed responsive mechanism 119 in a manner such that the contact arm 122 will come in contact with its contact a, thereby completing a circuit from the battery terminal B, through the electrical lead 123, the contact arm 122, its contact a, relay A, the back contact c of the relay B, and the back contact c of the relay C, the electrical lead 113, and the train speed comparator 116 to ground. When this condition arises, the relay A will be picked up and the following control circuit will come into effect. When relay A is picked up, as can be seen in FIG. 6, its front contacts b, c and d become closed and provide a circuit passing from the alternator 75, which is an 8-pole alternator, and produce a frequency output four times that being delivered by the wayside, or 60 cycles per second. This signal which appears in the three leads that emanate from the alternator 75 will complete a circuit over the front contacts b, c and d of the relay A, the back contacts g, h and i of relay B, and the electrical leads 141, 142 and 143, respectively, into the inverter means 160, and these signals will control the inverters 127, 128 and 129 to deliver power from the power supply 61 via electrical lead 62 in a timed sequence such that the power appearing in the electrical leads 165, 166 and 167, which extend to the right from the inverter means 160, will pass over the front contacts a, b and c of the relay PBCR, and thence over the electrical leads 175, 176 and 177 and into the pole per phase selection means 180. This power will continue to be delivered over the back contacts g, h and i of the relay C, thence over the back contacts l, m and n of the relay B, and finally with the relay A picked up, the power will be delivered over the front contacts f, g and i of the relay A, through the terminals 4, 5 and 6 of the winding 191. This terminal connection 4, 5 and 6 will provide a pole per phase selection which, as can be seen from the graph shown in FIG. 9, will permit the train to continue its acceleration over a range of 7.5 cycles per second to 15 cycles per second, and during this range increase in speed will be linearly proportional and follow the same curve as that which the train operated on between zero and 7.5 cycles per second delivered from the wayside.

When the signal delivered from the wayside has reached 30 cycles per second, the following circuits will be completed. The split phase induction motor 35, which is being driven at a speed proportional to the frequency delivered, will therefore drive the alternator 74 through the mechanical linkage 45 at a speed proportional to the frequency received from the wayside, and the output from the alternator 74 will form a complete circuit via the frequency selector means 140 to the inverter 160 and thence through the pole per phase selection means 180 to the propulsion motor 190 in the following manner. It will be noted that the mechanical linkage 45 which is driving the alternator 74 is also driving the centrifugal speed responsive mechanism 119 which in turn has caused the contact arm 122 to move upward in an arcuate manner away from the contact a of the contact arm 122, and this contact arm 122 is now in contact with the contact b of the contact arm 122 and a circuit is completed in the following manner. The circuit includes the battery terminal BA, the electrical lead 123, the contact arm 122, its contact b, and since the relay A is a slow release relay, the circuit will be completed over the front contact a of the relay A, through the winding of the relay B, thence over the back contact b of the relay C, and the electrical lead 114, which enters the train speed comparator 116, the circuit being completed with the ground connection made to the train speed comparator 116. With the relay B picked up, and the relay A in its released position, the system is now in a state or condition where the next train speed frequency range of control may be employed. Accordingly, the circuit between the alternator 74 and the propulsion induction motor 190 is completed over the following set of parallel paths. The outputs from the alternator 74 pass the signal over the front contacts d, e and f of the relay B, thence over the back contacts d, e and f of the relay C, through the electrical lead 141, which enters the inverter 160, and exit with the leads 165, 166 and 167, which electrical leads 165, 166 and 167 deliver power to the pole per phase selection means over the front contacts a, b and c of the relay PBCR, thence over the electrical leads 175, 176 and 177, which enter the pole per phase selection means 180. The power in the leads 175, 176 and 177 then passes over the back contacts g, h and i of relay C, and thence over the front contacts l, m and n of relay B where this power is then applied to the terminal connection 1, 2 and 3 of the winding 192. This connection 1, 2 and 3 has a 4-pole per phase configuration and therefore the train will be driven in this frequency range by the 4-pole per phase winding connection of the induction propulsion motor 190.

As the frequency of the signal from the wayside increases and accordingly the speed of the split phase induction motor increases, the alternator 73 and its output will be utilized when the train is operating in the frequency range between 30 and 60 cycles per second. In this case, the alternator 73 is a 2-pole alternator and, as has been noted, the mechanical linkage 45 will drive the centrifugal speed device 119 at a speed such that the contact arm 122 moves from the contact b position into contact with its contact c, thereby completing a circuit from the battery terminal B over the electrical lead 123, the contact arm 122, the contact C, and thence over the front contact a of the relay B, through the relay C, and over the electrical lead 115 to train speed comparator 116 and thence to ground to complete a circuit. When this condition has occurred, the relay C will be picked up. When relay C picks up it will be noted that the contacts g, h and i of the relay C will cause a break in the circuit that connects the alternator 76 with the inverter, thereby rendering a further assurance of fail-safe operation. With the relay C picked up the following control circuit will come into usage. The outputs from the alternator 73 will complete a circuit over the front contacts d, e and f of the relay C, thence over the electrical leads 141, 142 and 143, through the inverter 160 and pass over the electrical leads 165, 166 and 167 over the front contacts a, b and c of relay PBCR, through the electrical leads 175, 176 and 177, thence over the front contacts g, h and i of the relay C, where these signals will be delivered to the terminals 4, 5 and 6 of the winding 192. It is therefore seen that when the train is operating in the 30 to 60 cycle per second speed range determined by the wayside transmitter frequency being delivered to the rails, the propulsion induction motor winding is that of a 2-pole per phase winding and the train therefore may operate up to the maximum permissible speed during this frequency range of 30 to 60 cycles per second.

From the above it will be seen that this last embodiment sets forth an arrangement in which the selection of alternator frequency output is directly dependent upon the frequency range determined to be the most efficient for train operation and the pole per phase selection means is mutually dependent upon the frequency range which has been designed into the system. This system therefore provides a smoothly variable increase in speed over the varying frequency range from the wayside transmitter and does so in a wholly fail-safe manner never before known in the propulsion systems for automated train operation.

While the present invention has been illustrated and disclosed in connection with the details of the illustrative embodiments thereof, it should be understood that these are not intended to be limitative of the invention as set forth in the accompanying claims.

Having thus described my invention, what I claim is:

1. A train propulsion motor speed control system having a direct current power supply for said propulsion motor comprising:
    (a) a train-carried command signal detector means,
    (b) a source of distinctive command signals to control the speed of said train electrically coupled to said command signal detector means,
    (c) a command signal responsive means electrically connected to and controlled by said train-carried command signal detector means,
    (d) a frequency selector means electrically connected to said command signal responsive means,
    (e) a speed indication control means having a first and second output, said first output controlling said frequency selector means,
    (f) a multiphase propulsion induction motor having a number of connections to provide a multiple of different pole per phase connections,
    (g) an inverter means and a pole per phase selection means,
    (h) said pole per phase selection means being controlled by said speed indication control means to connect said inverter means with its related direct current power supply to a selected pole per phase connection of said propulsion motor to thereby establish a propulsion speed control for said train propulsion motor which speed control is mutually dependent upon said distinctive command signal source and said pole per phase selection controlled by said speed indication control means.

2. A train propulsion motor speed control system having a direct current power supply for said propulsion motor comprising:
    (a) a train-carried frequency detector means,
    (b) a source of variable frequency to control the speed of said train electrically coupled to said frequency detector means,
    (c) a frequency responsive means electrically connected to and controlled by said train-carried frequency detector means,
    (d) a frequency selector means electrically connected to said frequency responsive means,
    (e) a train speed responsive means having a first and second output, said first output controlling said frequency selector means,
    (f) a multiphase propulsion induction motor having a number of connections to provide a plurality of different poles per phase connections,
    (g) an inverter means and a pole per phase selection means,
        said inverter means electrically connected to said frequency selector means, said direct current power supply and said pole per phase selection means,
    (h) said pole per phase selection means being controlled by said second output of said train speed responsive means to connect said inverter means with its related direct current power supply to a selected pole per phase connection of said propulsion motor to thereby establish a propulsion speed control for said train's propulsion motor which speed control is mutually dependent upon said variable frequency of said variable frequency source and said pole per phase selection controlled by said train speed responsive means.

3. The train propulsion motor speed control system of claim 2 wherein said train-carried frequency detector is a pair of coils mounted on said train.

4. The train propulsion motor speed control system of claim 2 wherein said source of variable frequency includes a wayside variable frequency transmitter electrically coupled to the rails upon which said train travels and a transmission link to said train which includes said rails.

5. The train propulsion motor speed control system of claim 2 wherein said frequency responsive means is comprised of a frequency speed controlled motor.

6. The train propulsion motor speed control system of claim 5 wherein said frequency speed control motor drives an alternator means,
    said alternator means having an output which controls through said frequency selector means said inverter means to vary the rate and the time sequence of direct current power supply to said multiphase propulsion motor.

7. The train propulsion motor speed control system of claim 6 wherein said alternator means has two output ranges which are proportional to said variable frequency received by said train-carried frequency detector means.

8. The train propulsion motor speed control system of claim 2 wherein said inverter means includes an individual inverter for each phase of said multiphase propulsion induction motor which is selected by said pole per phase selection means,
    each of said individual inverters having a first, second and third input, and a single output,
    said first and said second inputs electrically connected to said frequency responsive means, and said third input electrically connected to said direct current power supply,
    each of said single inverter outputs electrically coupled to an individual pole per phase connection of said propulsion motor determined by said pole per phase selection means.

9. The train propulsion motor speed control system of claim 2 in which said direct current power supply is derived from a combustion engine driven direct current generator and said multiphase propulsion motor has a single stator winding and two different sets of different numbers of poles of pole per phase connections.

10. The train propulsion motor speed control system of claim 2 in which said direct current power supply is derived from the wayside when said train is operated in electrified territory and said multiphase propulsion motor has a single stator winding and two different sets of different numbers of poles of pole per phase connections.

11. The train propulsion motor speed control system of claim 2 wherein said train speed responsive means has two simultaneously occurring control outputs which control respectively said frequency selector means and said pole per phase selection means when said train reaches a predetermined intermediate speed.

12. A train propulsion motor speed control system having a direct current power supply for said propulsion motor comprising:
    (a) a signal source of variable frequency energy to control the train propulsion motor speed,
    (b) a train-carried frequency detector means to detect said signal of variable frequency,
    (c) a frequency responsive means electrically connected to and controlled by said frequency detector means,
        said frequency responsive means having two output ranges which are directly proportional to individual range portions of said variable frequency received by said train-carried frequency detector means, one of said output ranges being twice the variable frequency received by said train-carried frequency detector means,
    (d) a frequency selector means selectably connectable to one of said range outputs of said frequency responsive means,
    (e) a train speed responsive means having a first and second output, said first output controlling the selectable connection of said frequency selector means between said two ranges,
    (f) a multiphase propulsion induction motor having a number of connections to provide a plurality of different poles per phase, (g) an inverter means and a pole per phase selection means, said inverter means electrically connected to said frequency selector means, said direct current power supply and said pole per phase selection means, (h) said pole per phase selection means being controlled by said second output of said train speed responsive means to connect said inverter means with its related direct current power supply to a pole per phase connection of said propulsion motor such that when said train speed responsive means has caused the selection of said output range which doubles the frequency of the received variable frequency energy, the pole per phase connection to said propulsion motor will be double the number of poles per phase that are utilized when said train speed responsive means has connected said frequency selector means to the remaining range output of said frequency responsive means to thereby establish a propulsion speed control for said train's propulsion motor which speed control is mutually dependent upon said variable frequency source and said pole per phase selection controlled by train speed responsive means.

13. The train propulsion motor speed control system of claim 12 wherein said train-carried frequency detector is a pair of coils mounted on said train.

14. The train propulsion motor speed control system of claim 12 wherein said source of variable frequency includes a wayside variable frequency transmitter electrically coupled to the rails upon which said train travels and a transmission link to said train which includes said rails.

15. The train propulsion motor speed control system of claim 12 wherein said frequency responsive means is comprised of a frequency speed controlled motor.

16. The train propulsion motor speed control system of claim 15 wherein said frequency speed control motor drives an alternator means, said alternator means having an output which controls through said frequency selector means said inverter means to vary the rate and the time sequence of direct current power supply to said multiphase propulsion motor.

17. The train propulsion motor speed control system of claim 16 wherein said alternator means has two output ranges which are proportional to said variable frequency received by said train-carried frequency detector means.

18. The train propulsion motor speed control system of claim 12 wherein said inverter means includes an individual inverter for each phase of said multiphase propulsion induction motor which is selected by said pole per phase selection means, each of said individual inverters having first, second and third inputs, and a single output, said first and said second inputs electrically connected to said frequency responsive means, and said third input electrically connected to said direct current power supply, each of said single inverter outputs electrically coupled to an individual pole per phase connection of said propulsion motor determined by said pole per phase selection means.

19. The train propulsion motor speed control system of claim 12 in which said direct current power supply is derived from a combustion engine driven direct current generator and said multiphase propulsion motor has a single stator winding and two different sets of different numbers of poles of pole per phase connections.

20. The train propulsion motor speed control system of claim 12 in which said direct current power supply is derived from the wayside when said train is operated in electrified territory and said multiphase propulsion motor has a single stator winding and two different sets of different numbers of poles of pole per phase connections.

21. The train propulsion motor speed control system of claim 12 wherein said train speed responsive means has two simultaneously occurring control outputs which control respectively said frequency selector means and said pole per phase selection means when said train reaches a predetermined intermediate speed.

22. A train propulsion motor speed control system having a direct current power supply for said propulsion motor comprising:

(a) a train-carried frequency detector means, (b) a source of variable frequency to control the speed of said train electrically coupled to said frequency detector means, (c) a first frequency responsive means electrically connected to and controlled by said train-carried frequency detector means, (d) a frequency selector means electrically connected to said first frequency responsive means, (e) a second frequency responsive means controlled by said first frequency responsive means and having a first and second output, said first output controlling said frequency selector means, (f) a multi-winding multiphase propulsion induction motor having a number of connections for each winding to provide a plurality of different pole per phase connections, (g) an inverter means and a pole per phase selection means, said inverter means electrically connected to said frequency selector, said direct current power supply and said pole per phase selection means, (h) said pole per phase selection means being controlled by said second output of said second frequency responsive means to connect said inverter means with its related direct current power supply to a selected pole per phase connection of one of said windings of said propulsion motor to thereby establish a propulsion speed control for said train's propulsion motor which speed control is mutually dependent upon said variable frequency of said variable frequency source and said pole per phase selection controlled by said second frequency responsive means.

23. The train propulsion motor speed control system of claim 22 wherein said train-carried frequency detector is a pair of coils mounted on said train.

24. The train propulsion motor speed control system of claim 22 wherein said source of variable frequency includes a wayside variable frequency transmitter electrically coupled to the rails upon which said train travels and a transmission link to said train which includes said rails.

25. The train propulsion motor speed control system of claim 22 wherein said frequency responsive means is comprised of a frequency speed controlled motor.

26. The train propulsion motor speed control system of claim 25 wherein said frequency speed control motor drives an alternator means, said alternator means having an output which controls through said frequency selector means said inverter means to vary the rate and the time sequence of direct current power supply to said multiphase propulsion motor.

27. The train propulsion motor speed control system of claim 22 wherein said inverter means includes an individual inverter for each phase of said multiphase propulsion induction motor which is selected by said pole per phase selection means, each of said individual inverters having first, second and third inputs, and a single output, said first and said second inputs electrically connected to said first frequency responsive means, and said third input electrically connected to said direct current power supply, each of said single inverter outputs electrically coupled to an individual pole per phase connection of said propulsion motor determined by said pole per phase selection means.

28. The train propulsion motor speed control system of claim 22 in which said direct current power supply is derived from a combustion engine driven direct current generator.

29. The train propulsion motor speed control system of claim 22 in which said direct current power supply is derived from the wayside when said train is operated in electrified territory.

30. The train propulsion motor speed control system of claim 22 wherein said second frequency responsive means has two simultaneously occurring control outputs which control respectively said frequency selector means and said pole per phase selection means when said train reaches each one of the intermediate frequency ranges.

31. A train propulsion motor speed control system having a direct current power supply for said propulsion motor comprising:
 (a) a signal source of variable frequency energy to control the train propulsion motor speed,
 (b) a train-carried frequency detector means to detect said signal of variable frequency,
 (c) a first frequency responsive means electrically connected to and controlled by said frequency detector means,
   said first frequency responsive means having a plurality of output ranges which are directly proportional to individual range portions of said variable frequency received by said train-carried frequency detector means,
 (d) a frequency selector means selectably connected to one of said range outputs of said frequency responsive means,
 (e) a second frequency responsive means controlled by said first frequency responsive means and having a first and second output, said first output controlling said frequency selector means,
 (f) a multi-winding, multiphase propulsion induction motor having a number of connections for each winding to provide a plurality of different pole per phase connections,
 (g) an inverter means and a pole per phase selection means,
   said inverter means electrically connected to said frequency selector, said direct current power supply and said pole per phase selection means,
 (h) said pole per phase selection means being controlled by said second output of said frequency responsive means to connect said inverter means with its related direct current power supply to a selected pole per phase connection of one of said windings of said propulsion motor to thereby establish a propulsion speed control for said train's propulsion motor which speed is mutually dependent upon said variable frequency of said variable frequency source and said pole per phase selection controlled by said second frequency responsive means.

No references cited.

ARTHUR L. LA POINT, *Primary Examiner.*

S. T. KRAWCZEWICZ, *Assistant Examiner.*